United States Patent [19]

Windhager et al.

[11] 4,259,411

[45] Mar. 31, 1981

[54] ELECTROCONDUCTIVE COATING FORMULATIONS

[75] Inventors: Robert H. Windhager; Mei H. Hwang, both of Pittsburgh, Pa.

[73] Assignee: Calgon Corporation, Pittsburgh, Pa.

[21] Appl. No.: 70,757

[22] Filed: Sep. 5, 1979

Related U.S. Application Data

[63] Continuation-in-part of Ser. No. 960,793, Nov. 15, 1978, abandoned.

[51] Int. Cl.[3] ........................ B05D 1/38; B32B 27/10; G03G 5/10; G03G 5/14

[52] U.S. Cl. ........................................ 428/511; 427/121; 427/382; 427/411; 428/514; 428/515; 428/520; 428/521; 428/532; 428/533; 428/512; 430/64

[58] Field of Search ........................ 427/121, 411, 382; 428/413, 514, 515, 520, 511, 521, 532, 533, 512; 430/64

[56] References Cited

U.S. PATENT DOCUMENTS

| | | | |
|---|---|---|---|
| 3,634,135 | 1/1972 | Akiyama et al. | 427/121 |
| 3,639,640 | 2/1972 | Gager | 427/121 |
| 3,653,894 | 4/1972 | Levy et al. | 427/121 |
| 3,661,696 | 5/1972 | Knutson | 428/514 |
| 3,887,751 | 6/1975 | Markhart et al. | 428/514 |
| 3,944,705 | 3/1976 | Fujioka et al. | 427/121 |
| 4,024,311 | 5/1977 | MacDonald et al. | 428/514 |
| 4,097,646 | 6/1978 | Kitahara et al. | 428/514 |

*Primary Examiner*—James C. Cannon
*Attorney, Agent, or Firm*—Mario A. Monaco; Martin L. Katz

[57] ABSTRACT

Electroconductive coating formulations consisting essentially of (1) a barrier coating which comprises a copolymer of ethylene and vinyl acetate, styrene-butadiene latexes, sodium alginate or fluorocarbons with starch; and (2) a conductive coating.

5 Claims, No Drawings

ELECTROCONDUCTIVE COATING FORMULATIONS

This application is a continuation-in-part of copending U.S. Ser. No. 960,793, filed Nov. 15, 1978, and now abandoned.

This invention relates to an improved electroconductive paper.

More particularly, this invention relates to an improved electroconductive paper that has improved solvent holdout and conductive properties with lower degrees of tackiness, particularly in high relative humidity environments.

In the coating art, as presently practiced for electroconductive papers, barrier coatings usually consist of only starch, commonly chemically modified types of starch, or a combination of starch and a resin, such as styrene-maleic anhydride copolymer. The barrier coated sheet is subsequently overcoated with a coating that has electroconductive properties and is then referred to in the trade as conductive base stock. Using the preceding manufacturing process, frequenct problems occur with the base stock in obtaining the required degree of solvent holdout, conductivity and low tackiness. Particularly, at high relative humidities, tackiness of the conductivized paper causes numerous production problems on the coating machine and calender stacks, resulting in reel blocking and processing difficulties.

Our unique barrier coating for electroconductive paper, when used in combination with a suitable conductive polymer formulation, will provide a finished conductive base stock that has improved solvent holdout and conductivity, and a low degree of tackiness at high relative humidities.

These and other objects of this invention are accomplished by applying the special barrier coating of this invention to the paper raw stock. The barrier coating consists essentially of from about 5 to about 50 percent by weight of a copolymer of ethylene and vinyl acetate, a styrene-butadiene latex, sodium alginate or a fluorocarbon; and from about 50 to about 95 percent by weight of a modified starch. This coating may be applied to the paper raw stock by conventional coating techniques in amounts ranging from about 0.8 to about 3.5 g/m$^2$. The conductive coating contains from about 10 to about 90 percent by weight, preferably about 70 to about 90 percent by weight, of an electroconductive polymer and from about 10 to about 90 percent by weight of a combination of pigments and/or binders. This coating may also be applied to one or both sides of the barrier-coated paper by conventional coating techniques, such as blade, air knife or reverse roll methods in amounts ranging from about 0.8 to about 6.0 g/m$^2$ per side of the paper.

The preferred copolymer of ethylene and vinyl acetate is an aqueous latex product marketed by Air Products and Chemicals, Inc., as Airflex 110 and the preferred modified starch is a hydroxyethylated, acetylated, oxidized or cationic starch.

The nature of the electroconductive polymer component of the improved coating formulations of this invention is not critical. Any of a variety of electroconductive polymers, both cationic and anionic, may be employed provided that the conductive polymer selected is capable of imparting adequate surface resistivity to the base raw stock. As cationic electroconductive polymers, there may be employed any water-soluble cationic polymer containing quaternary ammonium functional groups. Included in such cationic polymers are those of the formula:

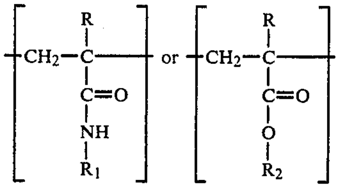

wherein:

R stands for hydrogen or lower alkyl;

$R_1$ represents a member of the class composed of $-A-\overset{\oplus}{N}-(R_3)_3$ or 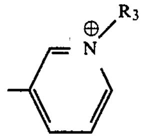

$R_2$ stands for $-A-N^{\oplus}-(R_3)_3$ wherein, in turn, A represents a lower alkylene, an hydroxy-lower alkylene or lower- alkyl-substituted lower alkylene group, and $R_3$ stands for a lower alkyl group. These polymers include those wherein the quaternary ammonium functional group is carried as a pendant group to the principal polymer chain, such as, for example, polyvinyl benzyl trimethyl ammonium chloride, poly- [alpha-(methylene trimethyl ammonium chloride)ethylene oxide] and poly(methacryloyloxyethyl trimethyl ammonium chloride). Also useful are those polymers wherein the quaternary ammonium functional group is incorporated in a cyclic structure which comprises a portion of the polymer backbone, such as, for example, polymers containing repeating units of the formula:

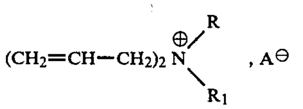

where R is an alkyl group of 1 to 18 carbon atoms and $R_1$ is R or $\beta$-propionamido and A is an anion. A preferred polymer of this class is poly-(dimethyldiallylammonium chloride); and those wherein the quaternary ammonium functional group forms a part of the polymer chain, such cationic polymers being commonly designated as "ionenes".

Included in this group, for example, are ionene polymers prepared from halo alkyl dialkyl amine monomer units, such as 3-ionene(poly-(dimethyl propyl)ammonium chloride), prepared by the polymerization of 3-chloropropyl dimethyl amine, and ionene polymers prepared from di-tertiaryamines and dihalides, such as 3,4-ionene which is prepared from 1,3-bis-dimethylamino propane and 1,4-dichlorobutene. Other ionene polymers, of course, which are prepared similarly, may be employed as the electroconductive component of the coating formulations of this invention.

In addition to the cationic electroconductive polymers mentioned above, water-soluble cationic phosphonium and sulfonium polymers also may be employed as the electroconductive component in the coating formulations of this invention. Included among these are polymers, such as, for example, poly-(2-acryloxyethyldimethyl sulfonium chloride) and poly-(glycidyltributyl phosphonium chloride) and the like.

It should be noted that the typical cationic and anionic polymers mentioned above may contain one or more other mer units. For example, copolymers such as the copolymer of dimethyl diallyl ammonium chloride and diacetone acrylamide or the reaction product of dimethyl diallyl ammonium chloride and the copolymer of styrene and maleic anhydride also can be used as the electroconductive component of the coating formulations of this invention. The ratio of mer units in such copolymers will be determined by the quantity of cationic or anionic necessary to impart the desired surface resistivity to the base sheet.

Although any of the electroconductive polymers noted above, or other electroconductive polymers capable of imparting the necessary degree of surface resistivity to the base sheet, may be employed as the electroconductive component in the improved coating formulations of this invention, the preferred electroconductive polymers are the cationic polymers and copolymers and especially cationic quaternary ammonium polymers and copolymers. Of these, the most preferred polymers are poly-(dimethyldiallylammonium chloride), copolymers of dimethyl diallyl ammonium chloride and diacetone acrylamide containing from 70 to 98% diallyl monomer, polyvinylbenzyl trimethyl ammonium chloride, polymethacryloyloxyethyl trimethyl ammonium chloride, polymethacryloyloxytrimethylammonium methosulfate, polyepiclorohydrin 80 to 100% quaternized with trimethylamine, copolymers of acrylamide and methacryloyloxyethyl trimethyl ammonium chloride containing from 90 to 99.5% methacryloyloxyethyl monomer units, poly-methacryloyloxyethyl dimethyl hydroxyethyl ammonium chloride) and poly-(dimethylpropylammonium chloride).

As noted above, the binders employed in the improved coating formulations of this invention can be of great variety and do not constitute a critical aspect of the instant invention. Any of the water-soluble, film-forming polymers conventionally employed for this purpose may be used in the coating formulations of this invention. Suitable binders will include, for example, polyvinylalcohols, polyvinyl acetates, styrenebutadiene latices, polyethylene-polyvinyl acetate copolymers, unmodified starches, acetylated starches, hydroxyethylated starches, enzyme converted starches, oxidized starches, proteins, caseins, and the like or mixtures thereof. Similarly, any of the variety of pigments conventionally employed in coating formulations may be employed in the improved coating formulations of this invention including commercially available calcium carbonates, kaolin clays, titanium dioxides, aluminas or combinations of these materials.

The electroconductive coating fromulation utilized in this invention may also contain certain mono- and bis-(1H,1H,2H,2H-perfluoroalkyl)-phosphate esters, when incorporated into electroconductive coating formulations in the quantities specified below, are effective in imparting to such formulations improved solvent holdout properties. In general, useful perfluoroalkyl phosphate esters will have the formula, $$(C_mF_{2m+1}C_nH_{2n}O)_yPO(OM)_{3-y}$$

wherein m is an integer between 4 and 10, n is an integer between 1 and 11, y is 1 or 2 and M is a water-solubilizing cation, such as, for example, an alkali metal (Li, K, Na and the like), ammonium or substituted ammonium including methylamine, dimethylamine, diethylamine, monoethanolamine, diethanolamine, triethanolamine or morpholine and the like. Preferred salts generally are the diethanolamine salts. Desirably, $C_m$ and $C_n$ taken together, constitute a straight chain of at least 8 carbon atoms. Such perfluoroalkyl phosphate esters are well-known materials and are available commercially or readily prepared by methods fully described in the art. Particularly preferred is the perfluoroalkyl phosphate ester manufactured by E. I. de Pont de Nemours Company, Inc., Wilmington, Delaware, under the Trademark, ZONYL RP, which contains diethanolamine salts of mono- and bis-(1H,1H,2H,2H-perfluoroalkyl) phosphates where the alkyl group is even numbered in the range $C_8$–$C_{18}$ and the salts have a fluorine content of 52.4% to 54.4% as determined on a solids basis or ammonium bis(N-ethyl-2-perfluoroalkylsulfonamido ethyl) phosphates, containing not more than 15% ammonium mono(N-ethyl-2-perfluoroalkylsulfonamido ethyl) phosphates, where the alkyl group is more than 95% $C_8$ and the salts have a fluorine content of 50.2% to 52.8% as determined on a solids basis. Materials of this type are sold by 3 M Co., Inc., under the Trademark SCOTCHBAN.

In order to illustrate the advantages derived from the present invention, the barrier coating and conductive coating formulations were applied to raw stock by drawdowns with the appropriate wire-wound rod and also ran a Keegan Pilot Coater. The coated sheets were conditioned overnight at 20% and 50% relative humidity (RH) and 72° F. after which they were weighed to obtain coatweight and evaluated for conductivity by using a Keithley 610B Electrometer to measure surface resistivity. Solvent holdout was determined by measuring dyed toluene penetration after 10 seconds contact time. Tackiness of the paper was determined by hand feel. The results of these tests are set forth in the following tables.

TABLE I

| Coating Composition | | Total Coat Weight ($g/m^2$) | | | % Toluene Penetration | |
|---|---|---|---|---|---|---|
| Barrier | Conductive | Barrier | Conductive | Total | Top | Back |
| 90% Starch | 90% PCL-7513 | | | | | |
| 10% Scripset | 10% $CaCO_3$ | 2.3 | 4.6 | 6.9 | 20–30 | 40 |
| 100% | 100% | | | | | |
| 90% Starch | 80% PCL-7513 | 2.2 | 4.5 | 6.7 | 20–30 | 40 |
| 10% Scripset | 20% $CaCO_3$ | 2.2 | 4.8 | 7.0 | 40 | 50 |
| 100% | 100% | | | | | |
| 90% Starch | 70% PCL-7513 | 2.1 | 4.2 | 6.3 | 20 | 95 |

TABLE I-continued

| Coating Composition | | Total Coat Weight ($g/m^2$) | | | % Toluene Penetration | |
|---|---|---|---|---|---|---|
| Barrier | Conductive | Barrier | Conductive | Total | Top | Back |
| 10% Scripset | 30% $CaCO_3$ | | | | | |
| 100% | 100% | | | | | |
| 90% Starch | 70% CP-261 | 2.2 | 4.3 | 6.5 | 10 | 50 |
| 10% Scripset | 30% $CaCO_3$ | | | | | |
| 100% | 100% | | | | | |
| 90% Starch | 80% PCL-7513 | 2.2 | 4.2 | 6.4 | 10 | 70 |
| 10% Scripset | 20% Clay | 2.2 | 4.9 | 7.1 | 10 | 60 |
| 100% | 100% | 2.3 | 4.3 | 6.6 | 10 | 60 |
| | | 2.0 | 4.7 | 6.7 | 6 | 15 |
| | | 2.0 | 5.9 | 7.9 | 6 | 40 |
| | | 2.1 | 4.5 | 6.6 | 6 | 15 |
| 90% Starch | 80% CP-261 | 2.2 | 4.5 | 6.7 | 30 | 50 |
| 10% Scripset | 20% Clay | | | | | |
| 100% | 100% | | | | | |
| 90% Starch | 30% CP-261 | 2.2 | 3.8 | 6.0 | 30 | 50 |
| 10% Scripset | 25% Airflex 110 | | | | | |
| 100% | 45% Clay | | | | | |
| | 100% | | | | | |
| 90% Starch | 80% ECR-77 | 2.0 | 4.1 | 6.1 | 50 | 70 |
| 10% Scripset | 20% Clay | | | | | |
| 100% | 100% | | | | | |
| 85% Starch | 90% PCL-7513 | 2.2 | 4.8 | 7.0 | 30 | 40 |
| 15% Scripset | 10% $CaCO_3$ | | | | | |
| 100% | 100% | | | | | |
| 85% Starch | 80% PCL-7513 | 2.0 | 4.6 | 6.6 | 15 | 40 |
| 15% Scripset | 20% Clay | 2.1 | 4.1 | 6.2 | 20 | 85 |
| 100% | 100% | | | | | |
| 85% Starch | 70% CP-261 | 2.3 | 4.2 | 6.5 | 20 | 50 |
| 15% Scripset | 30% $CaCO_3$ | | | | | |
| 100% | 100% | | | | | |
| 80% Starch | 90% PCL-7513 | 2.1 | 4.3 | 6.4 | 20 | 70 |
| 20% Scripset | 10% $CaCO_3$ | | | | | |
| 100% | 100% | | | | | |
| 80% Starch | 80% PCL-7513 | 2.0 | 4.3 | 6.3 | 30 | 70 |
| 20% Scripset | 20% $CaCO_3$ | | | | | |
| 100% | 100% | | | | | |
| 80% Starch | 80% PCL-7513 | 2.1 | 4.1 | 6.2 | 20 | 90 |
| 20% Scripset | 20% Clay | 2.2 | 4.3 | 6.5 | 40 | 50 |
| 100% | 100% | 2.2 | 4.1 | 6.3 | 40 | 90 |
| | | 2.2 | 4.7 | 6.9 | 6 | 50 |
| 80% Starch | 70% CP-261 | 2.1 | 4.2 | 6.3 | 20 | 70 |
| 20% Scripset | 30% $CaCO_3$ | | | | | |
| 100% | 100% | | | | | |
| 80% Starch | 40% CP-261 | 2.2 | 3.7 | 5.9 | 40 | 80 |
| 20% Scripset | 25% Airflex 110 | 2.0 | 5.5 | 7.5 | 15 | 50 |
| 100% | 35% Clay | 2.0 | 4.0 | 6.0 | 40 | 90 |
| | 100% | | | | | |
| 80% Starch | 30% CP-261 | 2.0 | 4.0 | 6.0 | 90 | 90 |
| 20% Scripset | 25% Airflex 110 | 2.0 | 5.2 | 7.2 | 70 | 90 |
| 100% | 45% Clay | 2.0 | 5.6 | 7.6 | 40 | 80 |
| | 100% | | | | | |
| 80% Starch | 80% PCL-7513 | 2.3 | 5.0 | 7.3 | 10 | 20 |
| 20% Airflex | 20% Clay | | | | | |
| 100% | 100% | | | | | |
| 80% Starch | 80% CP-261 | 2.5 | 4.9 | 7.4 | 50 | 70 |
| 20% Airflex | 20% Clay | | | | | |
| 100% | 100% | | | | | |
| 80% Starch | 80% ECR-77 | 2.3 | 4.2 | 6.5 | 10 | 30 |
| 20% Airflex | 20% Clay | | | | | |
| 100% | 100% | | | | | |
| 80% Starch | 70% CP-261 | 2.4 | 4.0 | 6.4 | 60 | 90 |
| 20% Airflex | 10% Airflex | | | | | |
| 100% | 20% Clay | | | | | |
| | 100% | | | | | |
| 100% Starch | 80% PCL-7513 | 2.2 | 4.5 | 6.7 | 50 | 100 |
| | 20% Clay | | | | | |
| | 100% | | | | | |
| 100% Starch | 30% CP-261 | 2.2 | 4.3 | 6.5 | 70 | 90 |
| | 25% Airflex 110 | | | | | |
| | 45% Clay | | | | | |

TABLE I-continued

| Coating Composition | | Total Coat Weight ($g/m^2$) | | | % Toluene Penetration | |
|---|---|---|---|---|---|---|
| Barrier | Conductive | Barrier | Conductive | Total | Top | Back |
| | 100% | | | | | |

Scripset is a styrene/maleic anhydride latex.
Airflex is a ethylene/vinylacetate latex.
CP-261 is a homopolymer of dimethyl diallyl ammonium chloride.
PCL-7513 is a physical blend of a homopolymer of dimethyl diallyl ammonium chloride and a fluorosurfactant.
ECR-77 is a homopolymer of benzyl trimethyl ammonium chloride.

TABLE II

| Coating Composition | | Total Coat Weight ($g/m^2$) | | | Surface Resistivity (ohms/sq.) | | | |
|---|---|---|---|---|---|---|---|---|
| | | | | | at 50% R.H. | | at 17.5% R.H. | |
| Barrier | Conductive | Barrier | Conductive | Total | Top | Back | Top | Back |
| 90% Starch<br>10% Scripset<br>100% | 90% PCL-7513<br>10% $CaCO_3$<br>100% | 2.3 | 4.6 | 6.9 | $2.8 \times 10^7$ | $1.9 \times 10^7$ | $4.1 \times 10^8$ | $3.8 \times 10^8$ |
| 90% Starch<br>10% Scripset<br>100% | 80% PCL-7513<br>20% $CaCO_3$<br>100% | 2.2 | 4.5 | 6.7 | $3.0 \times 10^7$ | $1.5 \times 10^7$ | $4.9 \times 10^8$ | $3.1 \times 10^8$ |
| 90% Starch<br>10% Scripset<br>100% | 70% PCL-7513<br>30% $CaCO_3$<br>100% | 2.1 | 4.2 | 6.3 | $3.0 \times 10^7$ | $1.9 \times 10^7$ | $4.5 \times 10^8$ | $3.3 \times 10^8$ |
| 90% Starch<br>10% Scripset<br>100% | 70% CP-261<br>30% $CaCO_3$<br>100% | 2.2 | 4.3 | 6.5 | $2.1 \times 10^7$ | $1.7 \times 10^7$ | $4.5 \times 10^8$ | $3.0 \times 10^8$ |
| 90% Starch | 80% PCL- | 2.2 | 4.2 | 6.4 | $3.1 \times 10^7$ | $2.2 \times 10^7$ | $4.1 \times 10^8$ | $3.3 \times 10^8$ |
| | 7513 | 2.2 | 4.9 | 7.1 | $4.5 \times 10^7$ | $1.7 \times 10^7$ | $4.5 \times 10^8$ | $3.1 \times 10^8$ |
| 10% Scrip- | 20% Clay | 2.3 | 4.3 | 6.6 | $3.1 \times 10^7$ | $1.8 \times 10^7$ | $4.5 \times 10^8$ | $3.6 \times 10^8$ |
| set | | 2.0 | 4.7 | 6.7 | $6.4 \times 10^6$ | $9.4 \times 10^6$ | $4.9 \times 10^8$ | $4.5 \times 10^8$ |
| 100% | 100% | 2.0 | 5.9 | 7.9 | $5.6 \times 10^7$ | $1.1 \times 10^7$ | $4.5 \times 10^8$ | $3.1 \times 10^8$ |
| | | 2.1 | 4.5 | 6.6 | $2.0 \times 10^7$ | $1.4 \times 10^7$ | $1.0 \times 10^9$ | $6.1 \times 10^8$ |
| 90% Starch<br>10% Scripset<br>100% | 80% CP-261<br>20% Clay<br>100% | 2.2 | 4.5 | 6.7 | $3.8 \times 10^7$ | $2.0 \times 10^7$ | $6.6 \times 10^8$ | $4.1 \times 10^8$ |
| 90% Starch<br>10% Scripset<br>100% | 30% CP-261<br>25% Airflex 110<br>45% Clay<br>100% | 2.2 | 3.8 | 6.0 | $7.2 \times 10^8$ | $2.5 \times 10^8$ | $1.8 \times 10^{10}$ | $4.1 \times 10^9$ |
| 90% Starch<br>10% Scripset<br>100% | 80% ECR-77<br>20% Clay<br>100% | 2.0 | 4.1 | 6.1 | $2.1 \times 10^7$ | $1.7 \times 10^7$ | $9.8 \times 10^8$ | $7.6 \times 10^8$ |
| 85% Starch<br>15% Scripset<br>100% | 90% PCL-7513<br>10% $CaCO_3$<br>100% | 2.2 | 4.8 | 7.0 | $1.8 \times 10^7$ | $1.1 \times 10^7$ | $3.1 \times 10^8$ | $2.1 \times 10^8$ |
| 85% Starch | 80% PCL- | 2.0 | 4.6 | 6.6 | $2.3 \times 10^7$ | $3.0 \times 10^7$ | $4.9 \times 10^8$ | $4.5 \times 10^8$ |
| 15% Scripset<br>100% | 7513<br>20% Clay<br>100% | 2.1 | 4.1 | 6.2 | $1.3 \times 10^7$ | $1.9 \times 10^7$ | $4.1 \times 10^8$ | $3.0 \times 10^8$ |
| 85% Starch<br>15% Scripset<br>100% | 70% CP-261<br>30% $CaCO_3$<br>100% | 2.3 | 4.2 | 6.5 | $3.3 \times 10^7$ | $1.9 \times 10^7$ | $4.1 \times 10^8$ | $3.3 \times 10^8$ |
| 80% Starch<br>20% Scripset<br>100% | 90% PCL-7513<br>10% $CaCO_3$<br>100% | 2.1 | 4.3 | 6.4 | $1.4 \times 10^7$ | $1.4 \times 10^7$ | $3.3 \times 10^8$ | $3.0 \times 10^8$ |
| 80% Starch<br>20% Scripset | 80% PCL-7513<br>20% $CaCO_3$ | 2.0 | 4.3 | 6.3 | $1.8 \times 10^7$ | $3.0 \times 10^7$ | $3.3 \times 10^8$ | $1.2 \times 10^8$ |

TABLE II-continued

| Coating Composition | | Total Coat Weight (g/m²) | | | Surface Resistivity (ohms/sq.) | | | |
|---|---|---|---|---|---|---|---|---|
| | | | | | at 50% R.H. | | at 17.5% R.H. | |
| Barrier | Conductive | Barrier | Conductive | Total | Top | Back | Top | Back |
| 100% | 100% | | | | | | | |
| 80% Starch | 80% PCL- | 2.1 | 4.1 | 6.2 | $2.8 \times 10^7$ | $2.8 \times 10^7$ | $4.1 \times 10^8$ | $3.8 \times 10^8$ |
| | 7513 | 2.2 | 4.3 | 6.5 | $2.3 \times 10^7$ | $2.1 \times 10^7$ | $3.6 \times 10^8$ | $4.1 \times 10^8$ |
| 20% Scrip- | 20% Clay | 2.2 | 4.1 | 6.3 | $2.1 \times 10^7$ | $2.5 \times 10^7$ | $3.6 \times 10^8$ | $3.8 \times 10^8$ |
| set | | 2.2 | 4.7 | 6.9 | $6.3 \times 10^6$ | $6.3 \times 10^6$ | $4.5 \times 10^8$ | $6.4 \times 10^8$ |
| 100% | 100% | | | | | | | |
| 80% Starch | 70% CP-261 | 2.1 | 4.2 | 6.3 | $1.9 \times 10$ | $1.9 \times 10$ | $3.8 \times 10$ | $3.1 \times 10$ |
| 20% Scrip- | 30% $CaCO_3$ | | | | | | | |
| set | | | | | | | | |
| 100% | 100% | | | | | | | |
| 80% Starch | 40% CP-261 | 2.2 | 3.7 | 5.9 | $1.3 \times 10^8$ | $3.1 \times 10^7$ | $1.9 \times 10^9$ | $1.1 \times 10^9$ |
| 20% Scrip- | 25% Airflex | 2.0 | 5.5 | 7.5 | $3.1 \times 10^7$ | $2.7 \times 10^7$ | $9.2 \times 10^8$ | $9.5 \times 10^8$ |
| set | 110 | 2.0 | 4.0 | 6.0 | $1.3 \times 10^8$ | $8.2 \times 10^7$ | $2.1 \times 10^9$ | $1.8 \times 10^9$ |
| | 35% Clay | | | | | | | |
| 100% | 100% | | | | | | | |
| 80% Starch | 30% CP-261 | 2.0 | 4.0 | 6.0 | $2.2 \times 10^8$ | $2.5 \times 10^8$ | $6.5 \times 10^9$ | $6.7 \times 10^9$ |
| 20% Scrip- | 25% Airflex | 2.0 | 5.2 | 7.2 | $1.3 \times 10^8$ | $1.3 \times 10^8$ | $4.1 \times 10^9$ | $4.5 \times 10^9$ |
| set | 110 | 2.0 | 5.6 | 7.6 | $3.1 \times 10^7$ | $2.7 \times 10^9$ | $4.1 \times 10^9$ | $4.1 \times 10^9$ |
| | 45% Clay | | | | | | | |
| 100% | 100% | | | | | | | |
| 80% Starch | 80% PCL- | 2.3 | 5.0 | 7.3 | $4.1 \times 10^7$ | $4.5 \times 10^7$ | $1.9 \times 10^9$ | $6.6 \times 10^8$ |
| | 7513 | | | | | | | |
| 20% Airflex | 20% Clay | | | | | | | |
| 100% | 100% | | | | | | | |
| 80% Starch | 80% CP-261 | 2.5 | 4.9 | 7.4 | $1.4 \times 10^8$ | $3.0 \times 10^7$ | $2.7 \times 10^9$ | $8.3 \times 10^8$ |
| 20% Airflex | 20% Clay | | | | | | | |
| 100% | 100% | | | | | | | |
| 80% Starch | 80% ECR-77 | 2.3 | 4.2 | 6.5 | $1.2 \times 10^8$ | $7.0 \times 10^7$ | $1.0 \times 10^9$ | $8.2 \times 10^8$ |
| 20% Airflex | 20% Clay | | | | | | | |
| 100% | 100% | | | | | | | |
| 80% Starch | 70% CP-261 | 2.4 | 4.0 | 6.4 | $9.4 \times 10^7$ | $4.5 \times 10^7$ | $2.4 \times 10^9$ | $8.9 \times 10^8$ |
| 20% Airflex | 10% Airflex | | | | | | | |
| | 20% Clay | | | | | | | |
| 100% | 100% | | | | | | | |
| 100% Starch | 80% PCL- | 2.2 | 4.5 | 6.7 | $4.5 \times 10^7$ | $7.2 \times 10^7$ | $7.3 \times 10^9$ | $1.0 \times 10^9$ |
| | 7513 | | | | | | | |
| | 20% Clay | | | | | | | |
| | 100% | | | | | | | |
| 100% Starch | 30% CP-261 | 2.2 | 4.3 | 6.5 | $5.8 \times 10^8$ | $4.1 \times 10^8$ | $9.1 \times 10^9$ | $8.2 \times 10^9$ |
| | 25% Airflex | | | | | | | |
| | 110 | | | | | | | |
| | 45% Clay | | | | | | | |
| | 100% | | | | | | | |

Scripset is a styrene/maleic anhydride latex.
Airflex is a ethylene/vinylacetate latex.
CP-261 is a homopolymer of dimethyl diallyl ammonium chloride.
PCL-7513 is a physical blend of a homopolymer of dimethyl diallyl ammonium chloride and a fluorosurfactant.
ECR-77 is a homopolymer of benzyl trimethyl ammonium chloride.

TABLE III

| Coating Composition | | Total Coat Weight (g/m²) | | | Tack | % Toluene Penetration | |
|---|---|---|---|---|---|---|---|
| Barrier | Conductive | Barrier | Conductive | Total | (0-5) | Top | Back |
| 90% Starch | 80% PCL-7513 | 2.4 | 5.8 | 8.2 | 4-5 | 20-30 | 20-30 |
| 10% Scripset 540 | 20% Clay | | | | | | |
| 100% | 100% | | | | | | |
| 80% Starch | 70% CP-261 | 2.4 | 3.6 | 6.0 | 5 | 30-40 | 40-60 |
| 20% Scripset 540 | 10% Airflex | | | | | | |
| | 20% Clay | | | | | | |
| 100% | 100% | | | | | | |
| 80% Starch | 70% CP-261 | 2.4 | 5.4 | 7.8 | 2-3 | 40-50 | 60-70 |
| 20% Airflex 110 | 10% Airflex | | | | | | |
| | 20% Clay | | | | | | |
| 100% | 100% | | | | | | |
| 80% Starch | 80% ECR-77 | 2.4 | 4.1 | 6.5 | 1 | 40-50 | 60-70 |
| 20% Airflex 110 | 20% Clay | | | | | | |
| 100% | 100% | | | | | | |
| 80% Starch | 80% PCL-7513 | 2.4 | 5.3 | 7.7 | 2 | 10 | 10 |
| 20% Airflex 110 | 20% Clay | | | | | | |
| 100% | 100% | | | | | | |

TABLE III-continued

| Coating Composition | | Total Coat Weight (g/m²) | | | | % Toluene Penetration | |
|---|---|---|---|---|---|---|---|
| Barrier | Conductive | Barrier | Conductive | Total | Tack (0-5) | Top | Back |
| | Raw Stock | — | — | — | 0 | 100 | 100 |

Scripset is a styrene/maleic anhydride latex.
Airflex is a ethylene/vinylacetate latex.
CP-261 is a homopolymer of dimethyl diallyl ammonium chloride.
PCL-7513 is a physcial blend of a homopolymer of dimethyl diallyl ammonium chloride and a fluorosurfactant.
ECR-77 is a homopolymer of benzyl trimethyl ammonium chloride.

TABLE IV

| Coating Composition | | Total Coat Weight (g/m²) | | | Surface Resistivity (ohms/sq.) at 50% R.H. | | at 17.5% R.H. | |
|---|---|---|---|---|---|---|---|---|
| Barrier | Conductive | Barrier | Conductive | Total | Top | Back | Top | Back |
| 90% Starch<br>10% Scripset 540<br>100% | 80% PCL-7513<br>20% Clay<br>100% | 2.4 | 5.8 | 8.2 | $1.1 \times 10^7$ | $1.1 \times 10^7$ | $4.5 \times 10^8$ | $4.5 \times 10^8$ |
| 80% Starch<br>20% Scripset 540<br>100% | 70% CP-261<br>10% Airflex<br>20% Clay<br>100% | 2.4 | 3.6 | 6.0 | $1.2 \times 10^7$ | $1.2 \times 10^7$ | $4.1 \times 10^8$ | $4.1 \times 10^8$ |
| 80% Starch<br>20% Airflex 110<br>100% | 70% CP-261<br>10% Airflex<br>20% Clay<br>100% | 2.4 | 5.4 | 7.8 | $2.5 \times 10^7$ | $2.8 \times 10^7$ | $6.5 \times 10^8$ | $6.7 \times 10^8$ |
| 80% Starch<br>20% Airflex 110<br>100% | 80% ECR-77<br>20% Clay<br>100% | 2.4 | 4.1 | 6.5 | $3.3 \times 10^7$ | $2.8 \times 10^7$ | $6.7 \times 10^8$ | $7.7 \times 10^8$ |
| 80% Starch<br>20% Airflex 110<br>100% | 80% PCL-7513<br>20% Clay<br>100% | 2.4 | 5.3 | 7.7 | $2.1 \times 10^7$ | $2.3 \times 10^7$ | $6.7 \times 10^8$ | $6.7 \times 10^8$ |
| | Raw Stock | — | — | — | $1.1 \times 10^{12}$ | $1.7 \times 10^{12}$ | $4.1 \times 10^{14}$ | $4.5 \times 10^{14}$ |

Scripset is a styrene/maleic anhydride latex.
Airflex is a ethylene/vinylacetate latex.
CP-261 is a homopolymer of dimethyl diallyl ammonium chloride.
PCL-7513 is a physical blend of a homopolymer of dimethyl diallyl ammonium chloride and a fluorosurfactant.
ECR-77 is a homopolymer of benzyl trimethyl ammonium chloride.

The following tables (Tables V, VI and VII) illustrate the formulation and performance of other representative barrier and conductive coating formulations.

TABLE V

COMPOSITION OF CONDUCTIVE COATING COLORS AND BARRIER COATING COLORS

| Component | Wt. % in Dry Coating | Wt. "as rec'd" in Color (g) | Dry Wt. in Color (g) |
|---|---|---|---|
| **Barrier Coatings** | | | |
| Kofilm 80 (25%)[1] | 80 | 96.0 | 24.0 |
| Airflex 110 (55%) | 20 | 10.9 | 6.0 |
| Water | — | 193.1 | — |
| | 100 | 300.0 | 30.0 |
| Kofilm 80 | 80 | 96.0 | 24.0 |
| Dylex K-55E (50%) | 20 | 12.0 | 6.0 |
| Water | — | 192.0 | — |
| | 100 | 300.0 | 30.0 |
| Kofilm 80 | 90 | 108.0 | 27.0 |
| Kelgin XL[2] | 10 | 3.0 | 3.0 |
| Water | — | 179.0 | — |
| | 100 | 300.0 | 30.0 |
| Kofilm 80 | 98 | 117.6 | 29.4 |
| Zonyl RP (33%) | 2 | 1.8 | 0.6 |
| Water | — | 180.6 | — |
| | 100 | 300.0 | 30.0 |
| **Conductive Coatings** | | | |
| PCL-7513 (20%) | 70 | 140.0 | 28.0 |

TABLE V-continued

COMPOSITION OF CONDUCTIVE COATING COLORS AND BARRIER COATING COLORS

| Component | Wt. % in Dry Coating | Wt. "as rec'd" in Color (g) | Dry Wt. in Color (g) |
|---|---|---|---|
| Nuclay (50%)[3] | 30 | 24.0 | 12.0 |
| Water | — | 36.0 | — |
| | 100 | 200.0 | 40.0 |
| Polymer E-949 (40%) | 70 | 70.0 | 28.0 |
| Nuclay | 30 | 24.0 | 12.0 |
| Water | — | 106.0 | — |
| | 100 | 200.0 | 40.0 |
| CP-261 LV (40%) | 68.6 | 68.6 | 27.4 |
| Scotchban FC-809 (33%) | 1.4 | 1.7 | 0.6 |
| Nuclay | 30.0 | 24.0 | 12.0 |
| Water | — | 105.7 | — |
| | 100.0 | 200.0 | 40.0 |
| CP-261 LV | 70 | 70.0 | 28.0 |
| Nuclay | 30 | 24.0 | 12.0 |
| Water | — | 106.0 | — |
| | 100 | 200.0 | 40.0 |
| Dow ECR-77 (34%) | 70 | 82.4 | 28.0 |
| Nuclay | 30 | 24.0 | 12.0 |
| Water | — | 93.6 | — |
| | 100 | 200.0 | 40.0 |
| CP-261 LV | 68.6 | 68.6 | 27.4 |
| Scotchban FC-809 | 1.4 | 1.7 | 0.6 |
| Albaglos (50%) | 30.0 | 24.0 | 12.0 |

TABLE V-continued

COMPOSITION OF CONDUCTIVE COATING COLORS AND BARRIER COATING COLORS

| Component | Wt. % in Dry Coating | Wt. "as rec'd" in Color (g) | Dry Wt. in Color (g) |
|---|---|---|---|
| Water | — | 106.8 | — |
| | 100.0 | 200.0 | 40.0 |

[1]Kofilm 80 was added as a 25% solution to the formulations
[2]Kelgin XL was dissolved in the available water before mixing with the Kofilm solution.
[3]Nuclay was added as a 50% solids slurry to the formulations.
Kofilm 80 is an acetylated starch.
Airflex 110 is an ethylene/vinylacatate latex.
Dylex K-55E is a styrene/butadiene latex.
Kelgin XL is sodium alginate.
PCL-7513 is a physical blend of a homopolymer of dimethyl diallyl ammonium chloride and a fluorosurfactant.
Nuclay is kaolin clay.
Polymer E-949 is a copolymer of 90% by weight dimethyldiallylammonium chloride and 10% by weight acrylamide.
Scotchban FC-809 is a fluorosurfactant.
Albaglos is a precipitated calcium carbonate.

TABLE VI

SOLVENT HOLDOUT AND SURFACE RESISTIVITY PROPERTIES OF DRAWDOWNS COATED WITH VARIOUS CONDUCTIVE COATINGS ON THE SAME TYPE

Paper Substrate: raw stock coated with a starch/Scripset barrier coating applied in paper mills

| Conductive Coating Composition | Coatweight on Top Side (g/m$^2$) | % Toluene Penetration on Top Side | Surface Resistivity at 15% R.H. (top side) |
|---|---|---|---|
| 70% PCL-7513 | 4.2 | 10–20 | $1.8 \times 10^8$ |
| 30% Clay | 4.5 | 10 | $1.8 \times 10^8$ |
| | 4.9 | 0 | $1.5 \times 10^8$ |
| 70% E-949 | 4.2 | 50 | $4.1 \times 10^8$ |
| 30% Clay | 4.4 | 50 | $4.5 \times 10^8$ |
| 68.6% CP-261LV | | | |
| 1.4% Scotchban FC-809 | 4.4 | 20–30 | $2.0 \times 10^8$ |
| 30.0% Clay | 4.8 | 30 | $1.6 \times 10^8$ |
| 70% CP-261LV | 4.2 | 50–60 | $1.3 \times 10^8$ |
| 30% Clay | 4.4 | 50–60 | $1.2 \times 10^8$ |
| 70% ECR-77 | 3.9 | 40 | $2.5 \times 10^8$ |
| 30% Clay | 4.1 | 30–40 | $2.8 \times 10^8$ |
| 68.6% CP-261LV | | | |
| 1.4% Scotchban FC-809 | 4.4 | 30–40 | $1.8 \times 10^8$ |
| 30.0% Calcium Carbonate | 4.7 | 40 | $1.7 \times 10^8$ |

PCL-7513 is a physical blend of a homopolymer of dimethyl diallyl ammonium chloride.
E-949 is a copolymer of 90% by weight dimethyldiallylammonium chloride and 10% by weight acrylamide.
CP-261LV is a homopolymer of dimethyldiallyl ammonium chloride.
Scotchban FC-809 is a fluorosurfactant.
ECR-77 is a homopolymer of benzyl trimethyl ammonium chloride.

TABLE VII

SOLVENT HOLDOUT AND SURFACE RESISTIVITY PROPERTIES OF DRAWDOWNS COATED WITH A PCL-7513 CONDUCTIVE FORMULATION ON VARIOUS TYPES OF BARRIER COATED RAW STOCKS

Conductive Coating: 70% PCL-7513
30% Clay

| Barrier Coating[1] | | Conductive | % Toluene | Surface |
|---|---|---|---|---|
| Identity | Coatweight (g/m$^2$) | Coatweight g/m$^2$)[2] | Penetration on Top Side | Resistivity at 15% R.H. |
| 80% Kofilm 20% Airflex | 1.6 | 2.0 | 10 | $6.1 \times 10^8$ |

TABLE VII-continued

SOLVENT HOLDOUT AND SURFACE RESISTIVITY PROPERTIES OF DRAWDOWNS COATED WITH A PCL-7513 CONDUCTIVE FORMULATION ON VARIOUS TYPES OF BARRIER COATED RAW STOCKS

Conductive Coating: 70% PCL-7513
30% Clay

| Barrier Coating[1] | | Conductive | % Toluene | Surface |
|---|---|---|---|---|
| Identity | Coatweight (g/m$^2$) | Coatweight g/m$^2$)[2] | Penetration on Top Side | Resistivity at 15% R.H. |
| 80% Kofilm 90%% Dylex | 1.5 | 2.3 | 10 | $4.5 \times 10^8$ |
| 90% Kofilm 10% Kelgin | 1.7 | 1.9 | 20–30 | $5.6 \times 10^8$ |
| 98% Kofilm 2% Zonyl | 1.4 | 2.0 | 30 | $6.4 \times 10^8$ |

[1]Applied to top side only
[2]Applied to top side only
Kofilm is an acetylated starch.
Airflex is an ethylene/vinylacetate latex.
Dylex is a styrene/butadiene latex.
Kelgin is sodium alginate.

We claim:

1. An electroconductive article having improved solvent holdout and a low degree of tackiness, said article comprising: a substrate; a barrier coating coated on at least one side thereof, said barrier coating consisting essentially of a copolymer of ethylene and vinyl acetate, a styrene-butadiene latex, sodium alginate or a fluorosurfactant and a modified starch; and an electroconductive coating overlaying said barrier coating.

2. An article as in claim 1 wherein both sides of the electroconductive article have an electroconductive coating.

3. An article as in claim 1 wherein the electroconductive polymer is a member selected from the group consisting of poly-(dimethyl diallyl ammonium chloride), a copolymer of dimethyl diallyl ammonium chloride and diacetone acrylamide containing from 70 to 98% of diallyl monomer units, polyvinylbenzyl trimethyl ammonium chloride, polymethacryloyloxyethyl trimethyl ammonium chloride, polymethacryloyloxyethyl trimethyl ammonium methosulfate, polyepichlorohydrin 80 to 100% quaternized with trimethylamine, copolymers of acrylamide and methacryloyloxyethyl trimethyl ammonium chloride containing from 90 to 99.5% methacryloyloxyethyl monomer units, poly-(methacryloyloxyethyl dimethyl hydroxyethyl ammonium chloride), and poly-(dimethyl propyl ammonium chloride).

4. An article as in claim 1 wherein the electroconductive polymer also contains a fluorosurfactant of the formula:

$$(C_mF_{2m+1}C_nH_{2n}O)_yPO(OM)_{3-y}$$

wherein m is an integer between 4 and 10, n is an integer between 1 and 11, y is or 2 and M is a watersolubilizing cation selected from the group consisting of an alkali metal, ammonium or substituted ammonium, or ammonium bis(N-ethyl-2-perfluoroalkylsulfonamido ethyl) phosphates, containing not more than 15% ammonium mono(N-ethyl-2-perfluoroalkylsulfonamido ethyl) phosphates, where the alkyl group is more than 95% $C_8$ and the salts have a fluorine content of 50.2 to 52.8% as determined on a solids basis.

5. A method of preparing an article as in claim 1, said method comprising the steps of applying the barrier coating to at least one side of the substrate, drying the barrier coated substrate, applying the conductive coating over the barrier coating and drying the conductive coating.

* * * * *